United States Patent [19]

Satake

[11] Patent Number: 4,738,439

[45] Date of Patent: Apr. 19, 1988

[54] PALLET-CLAMPING DEVICE

[75] Inventor: Eishin Satake, Kanazawa, Japan

[73] Assignee: Tsudakoma Kogyo Kabushiki Kaisha, Ishikawa, Japan

[21] Appl. No.: 943,392

[22] Filed: Dec. 19, 1986

[30] Foreign Application Priority Data

Dec. 27, 1985 [JP] Japan .................. 60-293283

[51] Int. Cl.$^4$ .............................................. B23Q 3/02
[52] U.S. Cl. .................................................. 269/309
[58] Field of Search ......... 198/345; 74/813 L, 813 R, 74/826, 816, 817; 269/309, 310, 74, 66, 69–70, 63

[56] References Cited

U.S. PATENT DOCUMENTS

| 4,201,284 | 5/1980 | Brems | 198/345 |
| 4,534,546 | 8/1985 | Cattani | 269/309 |
| 4,577,847 | 3/1986 | Schedwin | 269/309 |
| 4,583,631 | 4/1986 | Yonezawa et al. | 198/345 |

Primary Examiner—Robert C. Watson
Attorney, Agent, or Firm—Armstrong, Nikaido, Marmelstein & Kubovcik

[57] ABSTRACT

A manual operation type pallet-clamping device comprises a base block 11 to be secured to a work table 1 of a machine tool. A work pallet 2 for holding a work piece is positioned relative to the base block 11 by a positioning unit 15, and the work pallet 2 is clamped to the base block 11 by a clamping unit 14. A manual operation lever 17 is arranged to move between predetermined first and second positions, and an operating unit having an operation shaft 22 is arranged to simultaneously operate the positioning unit and the clamping unit in accordance with the movement of the manual operation lever 17 between the first and second positions.

5 Claims, 4 Drawing Sheets

PALLET-CLAMPING DEVICE

BACKGROUND OF THE INVENTION

1. Field of the Invention

The present invention relates to a pallet-clamping device used for a machine tool such as a machining center. More particularly, the present invention relates to a pallet-clamping device for manually carrying out the operations of positioning and clamping a work pallet to a work table of a machine tool.

2. Description of the Related Art

In a machine tool provided with a work table, such as a machining center, a pallet-clamping device for positioning and fixing a work pallet to the work table has been recently used together with a pallet-changing device for changing a work pallet on the pallet-clamping device. An ordinary pallet-clamping device comprises a base block secured to a work table of a machining center or the like, a positioning unit for positioning a work pallet relative to the base block, and a clamping unit for clamping the work pallet to the base block, and these positioning and clamping units are automatically operated by an actuator driven by a drive source such as a hydraulic pressure, pneumatic pressure, or electric power.

In this automatic pallet-clamping device, a work pallet delivered onto the pallet-clamping device can be automatically positioned and fixed, and therefore, this automatic pallet-clamping device can carry out a very efficient exchange of work pallets between the pallet-changing device and the machining center or the like. This type of pallet-clamping device, however, is expensive, and is disadvantageous in that careful maintenance is necessary. When the pallet-clamping device is attached to the already existing machining center or the like, complicated wiring work must be carried out and thus the cost is increased. Moreover, since a hydraulic pressure-generating device, a pneumatic pressure-generating device or the like must be provided, it is often difficult to later install such a device in a relatively small-sized factory.

To eliminate these disadvantages, a method may be considered in which the respective units of the pallet-clamping device are manually operated. In this case, however, the operation becomes complicated and a failure to perform a certain operation can result in an accident. Furthermore, when a work pallet is manually delivered onto the pallet-clamping device, if the delivery force is too strong, a return or rebound of the work pallet occurs and the subsequent clamping operation or positioning operation often becomes difficult.

SUMMARY OF THE INVENTION

It is a primary object of the present invention to provide a manual type pallet-clamping device which has a cheap and simple structure and can be later attached to an existing machine tool such as a machining center, and in which the operations of positioning and clamping a work pallet to a work table of the machine tool can be efficiently performed.

Another object of the present invention is to provide a manual type pallet-clamping device in which the operations of positioning and clamping a work pallet to a work table of a machine tool can be efficiently performed and a rebound of the work pallet can be completely prevented.

In accordance with one fundamental aspect of the present invention there is provided a pallet-clamping device comprising, a base block secured to a work table of a machine tool, a positioning unit for positioning a work pallet for holding a work piece relative to the base block, a clamping unit for clamping the work pallet to the base block, a manual operation lever movable between predetermined first and second positions, and an operating unit for simultaneously operating the positioning unit and the clamping unit in accordance with the movement of the manual operation lever between the first and second positions.

In accordance with another aspect of the present invention there is provided a pallet-clamping device comprising, a base block secured to a work table of a machine tool, a positioning unit for positioning a work pallet for holding a work piece relative to the base block, a clamping unit for clamping the work pallet to the base block, a latch unit engaged with the work pallet to prevent a rebound of the work pallet when the work pallet is supplied onto the base block along the top face of the clamping unit, a manual operation lever movable between predetermined first and second positions, and an operating unit for simultaneously operating the positioning unit and the clamping unit in accordance with the movement of the manual operation lever between the first and second positions, and for separating the latch unit from the work pallet when said manual operation lever moves between the first and second positions.

In the manual type pallet-clamping device of the present invention, since an actuator requiring a drive source such as a hydraulic pressure, a pneumatic pressure or an electric power is not necessary, the structure is simplified, and the pallet-clamping device can be easily attached later to an existing machine tool such as a machining center. Furthermore, since the positioning unit and clamping unit can be simultaneously operated by the manual operation lever, and the operations of these units can be simultaneously released, the clamping device can be simply handled and failure to perform the operation of the positioning unit or clamping unit can be prevented.

In the pallet-clamping device provided with a latch unit according to the present invention, when a work pallet is manually delivered onto the pallet-clamping device, the latch unit is automatically operated mechanically to prevent a rebound of the work pallet, and therefore, the subsequent clamping or positioning operation can be performed conveniently and safely. Moreover, when the positioning unit and clamping unit are operated by the manual operation lever, the latch unit can be separated, and therefore, the operation of separating the latch unit need not be independently performed and the entire operation is further simplified.

BRIEF DESCRIPTION OF THE DRAWINGS

The foregoing and other objects and advantages of the present invention will be better understood from the following description with reference to the preferred embodiments illustrated in the drawings; wherein.

DESCRIPTION OF THE PREFERRED EMBODIMENTS

Figure 1:
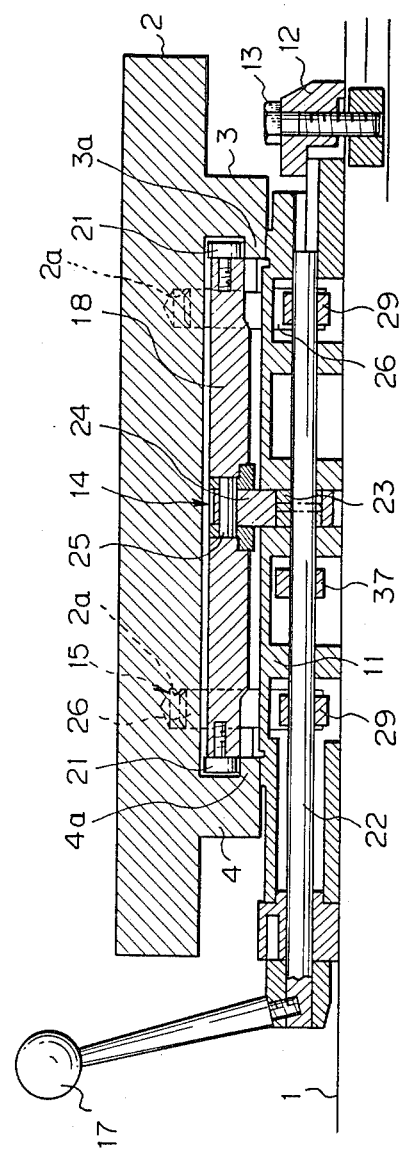
FIG. 1 is a view showing the section taken along the line I—I in FIG. 2 showing one embodiment of the pallet-clamping device according to the present invention.

FIGS. 1 through 4 show one embodiment of the pallet-clamping device according to the present invention.

Referring to FIGS. 1 through 4, the manual type pallet-clamping device has a base block 11 secured to a work table 1 of a work tool such as a machining center. The base block 11 is secured to a desired position on the work table 1 by a stopper 12 and a clamping bolt 13.

The pallet-clamping device comprises a clamping unit 14 for clamping a work pallet 2 to the base block 11, a positioning unit 15 for positioning the work pallet 2 relative to the base block 11, a latch unit 16 for preventing a rebound of the work pallet 2, and a manual operation lever 17.

Figure 2:
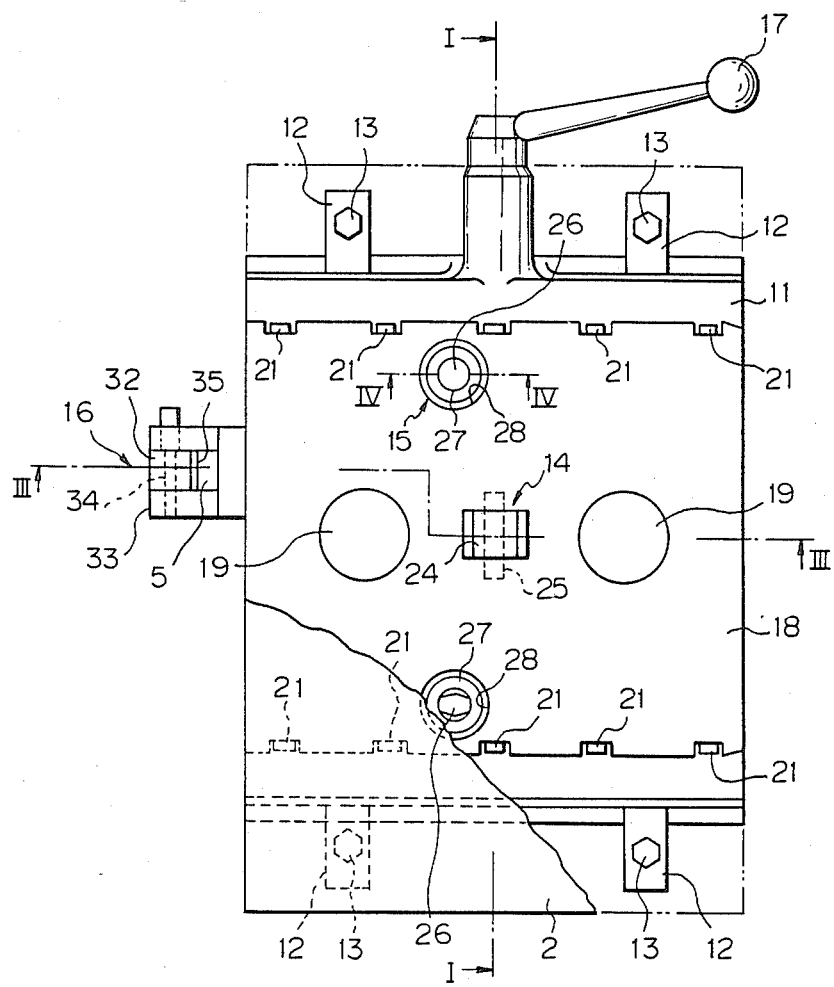
FIG. 2 is a partially cut-out plane view showing one embodiment of the pallet-clamping device according to the present invention.
Figure 3:
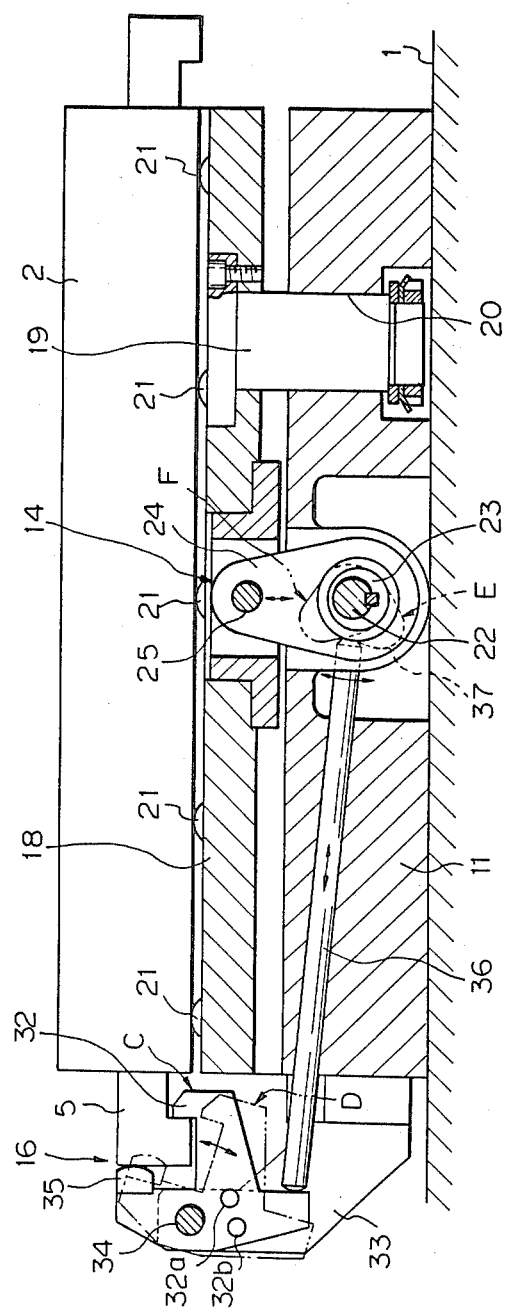
FIG. 3 is a view showing the section taken along the line III—III in FIG. 2.

The clamping unit 14 includes a clamp plate 18 slidably mounted on the base block 11. As shown in FIGS. 2 and 3, a pair of guide poles 19 extending downward are secured to the clamp plate 18, and the guide poles 19 are slidably fitted in a pair of guide holes 20 formed in the base block 11, respectively.

As shown in FIG. 2, a plurality of rollers 21 are arranged on the clamp plate 18 in two rows along the direction in which the work pallet 2 is supplied. As seen from FIG. 1, the top faces of the rollers 21 are located above the top face of the clamp plate 18, and the bottom faces of the rollers 21 are located above the lower face of the clamp plate 18.

As shown in FIG. 1, a pair of legs 3 and 4 are arranged on the lower face of the work pallet 2. The legs 3 and 4 extend downward below the work pallet 2 and along the direction in which the work pallet 2 is supplied. Ribs 3a and 4a extending inward are formed on the lower ends of the legs 3 and 4. The clamp plate 18 can move in the vertical direction relative to the base block 11. When the clamp plate 18 moves upward, the clamping unit 14 is in the unclamping state. In this state, the rollers 21 abut against the lower face of the supplied work pallet 2 to support the work pallet 2. Furthermore, in this state, the lower face of the clamp plate 18 is separate from and is located above the ribs 3a and 4a of the work pallet 2, and the lower faces of the ribs 3a and 4a are separate from the upper face of the base block 11 and located above the base block 11. Accordingly, the supplied work pallet 2 is smoothly guided by the rollers 21. On the other hand, when the clamp plate 18 moves downward, the clamping unit 14 is in the clamping state, and the ribs 3a and 4a of the work pallet 2 are clamped by the lower face of the clamp plate 18 and the upper face of the base block 11. In this state, the rollers 21 are separate from the lower face of the work pallet 2.

An operation shaft 22 extending in the direction orthogonal to the direction in which the work pallet 2 is supplied is rotatably supported on the base block 11, and a manual operation lever 17 is fixed to one end of the operation shaft 22. As shown in FIGS. 1 and 3, at substantially the center of the pallet-clamping device, an eccentric cam 23 is secured to the operation shaft 22, and a link lever 24 fitted with the eccentric cam 23 is pivoted on the clamp plate 18 by a pivoting pin 25. When the operation shaft 22 is rotated by the manual operation lever 17, the clamp plate 18 is displaced in the vertical direction together with the link lever 24 by the action of the eccentric cam 23, whereby the above-mentioned unclamping state and clamping state are alternatively reached.

Figure 4:
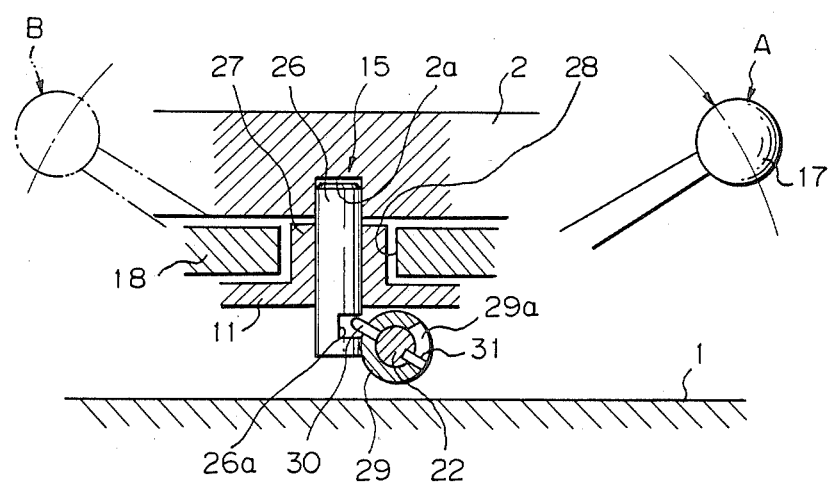
FIG. 4 is a view showing the section taken along the line IV—IV in FIG. 2.

As shown in FIGS. 1, 2, and 4, the positioning unit 15 has a pair of positioning pins 26, and these positioning pins 26 are slidably fitted in a pair of boss portions 27 formed on the base block 11, respectively, and the boss portions 27 are freely fitted in a pair of holes 28 formed in the clamp plate 18, respectively. A pair of positioning holes 2a, into which the positioning pins 26 can fit, respectively, are formed in the work pallet 2, and by engagement of the pins 26 with the holes 2a, the work pallet 2 is positioned relative to the base block 11.

As shown in FIG. 1, a pair of cams 29 are arranged on the operation shaft 22 to move the positioning pins 26 in the vertical direction. FIG. 4 shows in detail an engagement structure of one of the cams 29 with the operating shaft 22 and with the corresponding positioning pin 26. Referring to FIG. 4, the cam 29 has a claw 30 to be engaged with a notch 26a of the positioning pin 26. The cam 29 is rotatably fitted to the operation shaft 29. A slit 29a extending in the circumferential direction is formed in the cam 29, and a pin 31 to be located within the slit 29a is mounted on the operation shaft 22. In the state shown in FIG. 4, the positioning pin 26 is fitted in the positioning hole 2a of the work pallet 2, and the manual operation lever 17 is located at the position indicated by A in FIG. 4. At this time, the clamping unit 14 is in the clamping state. If the manual operation lever 17 is turned counterclockwise in the drawings, the operation shaft 22 is rotated counterclockwise together with the manual operation lever 17 and the pin 31 is moved within the slit 29a. The cam 29 is kept stationary and, hence, the positioning pin 26 is also kept stationary, at the position indicated in the drawings. When the manual operation lever 17 is turned further, the cam 29 receives the action of the pin 31 and is rotated counterclockwise to push down the positioning pin 26. When the manual operation lever 17 is located at the position indicated by B in the drawings, the clamping unit 14 is in the unclamping state, and the positioning pin 26 is separate from the positioning hole 2a of the work pallet 2.

Referring to FIGS. 2 and 3, the latch unit 16 has a movable hook 32, and this movable hook 32 is rotatably supported through a pivoting pin 34 on a bracket 33 mounted on the base block 11. The movable hook 32 has a stopper 35, and this stopper 35 can abut against a stationary hook 5 mounted on the end of the work pallet 2. The position of the movable hook 32 can be changed between a latching position for engagement with the stationary hook 5 of the work pallet 2 (position C in FIG. 3) and an unlatching position for separation from the stationary hook 5 (position D in FIG. 3).

Two dents 32a and 32b are formed on the side face of the movable hook 32. A ball (not shown in the drawings) that can be engaged with the dent 32a or 32b is held on the bracket 33 and urged toward the side face of the movable hook 32 by a spring, so that the movable hook 32 is held at the latching position C or the unlatching position D by engagement of the ball with the dent 32a or 32b of the movable hook 32.

When the movable hook 32 is located at the unlatching position D, if the stationary hook 5 of the work pallet 2 supplied onto the pallet-clamping device pushes the stopper 35 of the movable hook 32, the movable hook 32 is turned around the pivoting pin 34 and is changed to the latching position D, whereby a return of the work pallet 2, that is, a rebound of the work pallet 2, can be prevented.

As shown in FIG. 3, a push rod 36 is slidably mounted on the base block 11 in the longitudinal direction so that the push rod 36 can abut against the movable hook 32. An operation cam 37 that can abut against the push rod 36 is mounted on the operation shaft 22. When the manual operation lever 17 is located at the unclamping position B (see FIG. 4), the operation cam 37 is located at the position E shown in FIG. 3. If the manual operation lever 17 is shifted from the unclamping position B to the clamping position A, the operation cam 37 is moved from the position E to the position F. During this movement, the movable hook 32 located at the latching position C is pressed through the push rod 36 and the position of the movable hook 32 is changed from the latching position C to the unlatching position D.

In the pallet-clamping device having the above-mentioned structure, if the work pallet 2 is supplied from a pallet-changing device (not shown) onto the pallet-clamping device and the stationary hook 5 pushes the stopper 35 of the movable hook 32, the movable hook 32 becomes engaged with the stationary hook 5 to prevent rebound of the work pallet 2. If the manual operation lever 17 is then shifted to the clamping position A from the unclamping position B, the positioning pins 26 are fitted in the positioning holes 2a of the work pallet 2 to locate the work pallet 2 at a predetermined position. Simultaneously, by the action of the eccentric cam 23, the clamp plate 18 is caused to press the work pallet 2 onto the base block 11 and clamp the work pallet 2, and by the action of the operation cam 37 and push rod 36, the movable hook 32 is returned to the unlatching position D from the latching position C.

When the processing of a work piece on the work pallet 2 is completed, the manual operation lever 17 is shifted to the unclamping position B from the clamping position A, whereby the clamping unit 14 is changed from the clamping state to the unclamping state and the positioning pins 26 of the positioning unit 15 are separated from the positioning holes 2a, of the work pallet 2. Since the movable hook 32 of the latch unit 16 has been separated from the stationary hook 5 of the work pallet 2 at this point, after the manual operation lever 17 is shifted to the unclamping position B, the work pallet 2 can be immediately taken out from the pallet-clamping device.

The present invention is by no means limited to the above-mentioned embodiment illustrated in the accompanying drawings, but various modifications and changes can be made to the structural elements within the scope of the present invention set forth in the appended claims. Especially, various changes can be made to the means for transmitting the operating power of the manual operation lever to the positioning unit, clamping unit, and latch unit. Furthermore, an operating portion for separating the movable hook of the latch unit from the stationary hook of the work pallet may be arranged independently from the manual operation lever.

I claim:

1. A pallet-clamping device comprising:
    a base block secured to a work table of a machine tool;
    a positioning unit for positioning a work pallet for holding a work piece relative to said base block;
    a clamping unit for clamping said pallet to said base block;
    a manual operation lever movable between predetermined first and second positions; and
    an operating unit including an operation shaft mounted for movement relative to said base block and interconnecting said manual operation lever, said positioning unit and said clamping unit for simultaneously operating said positioning unit and said clamping unit in accordance with manual movement of said manual operation lever between said first and second positions.

2. A pallet-clamping device according to claim 1, wherein said positioning unit comprises a pair of positioning pins which can move between an engaging position where said positioning pins are engaged with said positioning holes of said work pallet and a disengaging position where said positioning pins are disengaged from said positioning holes, and said clamping unit comprises a clamp plate which can move between a clamping position where said clamp plate clamps said work pallet to said base block and an unclamping position where said clamp plate permits said work pallet to move freely, and wherein said operating unit comprises:
    an operation shaft rotatably supported on said base block and connected at one end thereof to said manual operation lever so as to rotate in accordance with movement of said manual operation lever between said first and second positions;
    a pair of cams supported on said operation shaft and connected to said positioning pins, respectively, so as to move said positioning pins from said disengaging position to said engaging position in accordance with rotational movement of said operation shaft upon movement of said manual operation lever from said first position to said second position and move said positioning pins from said engaging position to said disengaging position in accordance with rotational movement of said operation shaft upon movement of said manual operation lever from said second position to said first position; and
    connecting members which connect said clamp plate with said operation shaft so as to move said clamp plate from said unclamping position to said clamping position in accordance with rotational movement of said operation shaft upon movement of said manual operation lever from said first position to said second position and move said clamp plate from said clamping position to said unclamping position in accordance with rotational movement of said operation shaft upon movement of said manual operation lever from said second position to said first position.

3. A pallet-clamping device comprising:
    a base block secured to a work table of a machine tool;
    a positioning unit for positioning a work pallet for holding a work piece relative to said base block;
    a clamping unit for clamping said work pallet to said base block;
    a latch unit for preventing a rebound of said work pallet when said work pallet is supplied onto said base block along a top face of said clamping unit;
    a manual operation lever movable between a predetermined first unclamping position and a second clamping position; and
    an operating unit for simultaneously operating said positioning unit and said clamping unit in accordance with movement of said manual operation lever between said first and second positions and for separating said latch unit from said work pallet when said manual operation lever moves between said first and second positions.

4. A pallet-clamping device according to claim 3, wherein said positioning unit comprises a pair of positioning pins which can move between an engaging position where said positioning pins are engaged with said positioning holes of said work pallet and a disengaging position where said positioning pins are disengaged from said positioning holes, and said clamping unit comprises a clamp plate which can move between a clamping position where said clamp plate clamps said work pallet to said base block and an unclamping position where said clamp plate permits said work pallet to move freely, and wherein said operating unit comprises:

an operation shaft rotatably supported on said base block and connected at one end thereof to said manual operation lever so as to rotate in accordance with movement of said manual operation lever between said first and second positions;

a pair of cams supported on said operation shaft and connected to said positioning pins, respectively, so as to move said positioning pins from said disengaging position to said engaging position in accordance with rotational movement of said operation shaft upon movement of said manual operation lever from said first position to said second position and move said positioning pins from said engaging position to said disengaging position in accordance with rotational movement of said operation shaft upon movement of said manual operation lever from said second position to said first position; and connecting members which connect said clamp plate with said operation shaft so as to move said clamp plate from said unclamping position to said clamping position in accordance with rotational movement of said operation shaft upon movement of said manual operation lever from said first position to said second position and move said clamp plate from said clamping position to said unclamping position in accordance with rotational movement of said operation shaft upon movement of said manual operation lever from said second position to said first position.

5. A pallet-clamping device according to claim 4, wherein said latch unit comprises a movable hook supported on said base block and movable between a latching position there said movable hook is engaged with said work pallet so as to prevent rebound of said work pallet and an unlatching position where said movable hook is disengaged from said work pallet so as to permit said work pallet to move freely on said clamp plate, and wherein said operating unit further comprises a second cam fixedly mounted on said operation shaft and a push rod movably arranged between said second cam and said movable hook, said movable hook being kept at said unlatching position when said manual operation lever is kept at either said first or second positions, and moved from said unlatching position to said latching position by a pushing force acting thereon from said work pallet supplied onto said base block along said clamp plate, and also moved from said latching position to said unlatching position by a pushing force acting thereon from said second cam through said push rod when said operation shaft is rotated upon movement of said manual operation lever between said first and second positions.

* * * * *